UNITED STATES PATENT OFFICE.

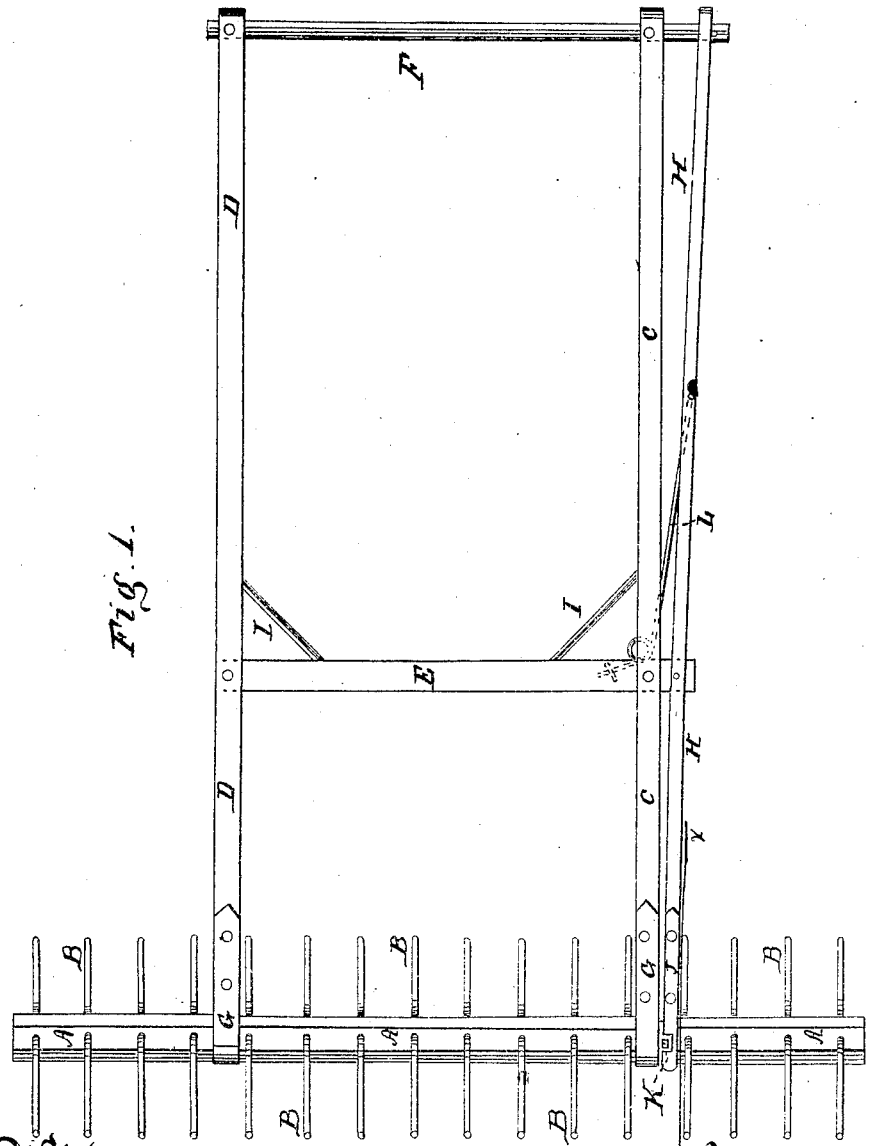

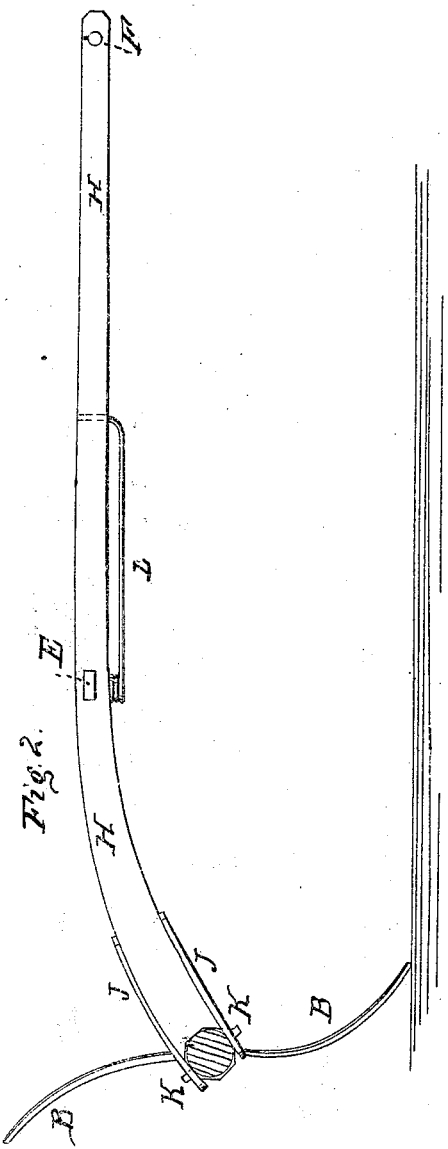

RALPH G. LAMSON, OF BROWNSVILLE, VERMONT.

IMPROVEMENT IN HAY-RAKES.

Specification forming part of Letters Patent No. 58,841, dated October 16, 1866.

*To all whom it may concern:*

Be it known that I, RALPH G. LAMSON, of Brownsville, in the county of Windsor and State of Vermont, have invented a new and useful Improvement in Revolving Hand Hay-Rakes; and I do hereby declare that the following is a full, clear, and exact description thereof, which will enable others skilled in the art to make and use the same, reference being had to the accompanying drawings, forming a part of this specification, in which—

Figure 1 is a top view of my improved hay-rake. Fig. 2 is a vertical section of the same, taken through the line $x$ $x$, Fig. 1.

Similar letters of reference indicate like parts.

My invention has for its object to furnish an improved hand hay-rake, by means of which hay may be raked by hand easily, quickly, and cleanly; and it consists of a hay-rake constructed and arranged as hereinafter more fully described.

A is the head of the rake, or the bar to which the teeth and shafts are attached. This head should be about five feet long and one and a half inch in diameter.

The teeth B are made of pieces of steel wire about twenty-five and a half inches in length and from three-sixteenths to one-quarter of an inch in diameter. These pieces of wire should be bent into the proper shape and passed through the head A, projecting on each side of said head. This makes the teeth B, that project on each side of the head, to be twelve inches in length. The teeth B may be secured in their places in the head or bar A by screws or in any other convenient way.

The shafts C and D should be about five and a half feet long and should be about two and a half feet apart. The ends of the shafts C and D that come in contact with the head A of the rake should be hollowed out, as represented in Fig. 2, and they should be attached to the said head by metallic straps G, as shown in Fig. 1. These straps G pass around the head A, fitting into grooves formed upon it for their reception, and are attached to the lower ends of the shafts C and D by screws, or in any other convenient manner. By this arrangement the head A is free to revolve in the straps upon the ends of the shafts, except when kept from revolving in the manner hereinafter described. The shafts C and D are held apart and kept in proper relative position by the cross-bars E and F, which are mortised into the shafts, as represented in Fig. 1. These cross-bars project beyond the shaft C, as shown, for the attachment of the spring-lever H. The shafts may also be further secured and strengthened by the braces I, attached to the said shafts and to the cross-bar E, as shown in Fig. 1.

The spring-lever H is pivoted to the projecting end of the cross-bar E, and its forward end works freely upon the projecting end of the cross-bar F. The lower end of the spring-lever is kept in place upon the head A by straps J, attached to its upper and lower sides above and below the head A, as shown in Fig. 2; or the straps J may be replaced by a single strap passing around the said head, and its ends attached to the spring-lever in the manner before described with reference to the lower ends of the shafts.

K is a pin passing through the head A and firmly secured in place, which fits into notches formed on the inner edges of the straps J, as shown in Fig. 1, and prevents the rake-head from revolving, while gathering the hay, until the lower end of the lever H is released from the pin K by pressing the upper end of said lever inward. This allows the head of the rake to revolve, depositing the hay in a windrow, and as the other set of teeth come into the proper position for gathering the hay, the notches on the straps J again take hold of the pin K and hold the rake-head until released, as before described.

L is a spring attached to the cross-bar E or shaft C, which presses the upper end of the lever H outward, forcing the lower end inward to take hold of the pin K when the rake-head has revolved into the proper position.

I claim as new and desire to secure by Letters Patent—

The notched straps J, in combination with the spring-lever H, operating with the pins K in the rake-head A, constructed and arranged in the manner and for the purpose herein specified.

RALPH G. LAMSON.

Witnesses:
EDWIN S. WOODS,
C. H. PERRY.